United States Patent
Loeffler et al.

(10) Patent No.: US 8,122,903 B2
(45) Date of Patent: Feb. 28, 2012

(54) CLOSE-COUPLED PURGEABLE VAPORIZER VALVE

(75) Inventors: Stephen D. Loeffler, Holland, PA (US); Seth B. Wolf, Fort Washington, PA (US); Charles W. Albrecht, Furlong, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 908 days.

(21) Appl. No.: 12/119,758

(22) Filed: May 13, 2008

(65) Prior Publication Data

US 2009/0025796 A1   Jan. 29, 2009

Related U.S. Application Data

(60) Provisional application No. 60/952,014, filed on Jul. 26, 2007.

(51) Int. Cl.
*F16K 24/00* (2006.01)
(52) U.S. Cl. ........ 137/154; 137/197; 137/198; 137/203; 261/50.3; 261/DIG. 65
(58) Field of Classification Search ................. 137/154, 137/197, 198, 203; 261/50.3, DIG. 65
See application file for complete search history.

(56) References Cited

U.S. PATENT DOCUMENTS

| | | | |
|---|---|---|---|
| 3,971,216 A | 7/1976 | Miller | |
| 5,224,513 A | 7/1993 | Bertone | |
| 5,419,924 A | 5/1995 | Nagashima et al. | |
| 5,865,421 A | 2/1999 | Ono | |
| 5,975,112 A | 11/1999 | Ohmi et al. | |
| 6,039,074 A * | 3/2000 | Raaijmakers et al. | 137/537 |
| 6,209,571 B1 | 4/2001 | Itoh et al. | |
| 6,345,642 B1 | 2/2002 | Yoshidome et al. | |
| 6,539,970 B1 | 4/2003 | Knowles et al. | |
| 6,540,840 B1 * | 4/2003 | Toda et al. | 118/726 |
| 6,715,507 B2 | 4/2004 | Arai et al. | |
| 7,021,330 B2 | 4/2006 | Maula et al. | |
| 7,066,194 B2 | 6/2006 | Ku et al. | |
| 7,222,636 B2 | 5/2007 | Nguyen et al. | |
| 2002/0023677 A1 | 2/2002 | Zheng et al. | |
| 2005/0011555 A1 | 1/2005 | Maula et al. | |
| 2006/0162780 A1 | 7/2006 | Matsuura | |

* cited by examiner

*Primary Examiner* — Robert J Hill, Jr.
*Assistant Examiner* — Christopher P Jones
(74) *Attorney, Agent, or Firm* — Thomas Fistek; John Molnar

(57) ABSTRACT

A method and system are provided for an integrated fluid and vapor delivery system design that optimizes vapor delivery. The method and system utilize a purgeable valve assembly which is closely coupled to a vaporizer. The purgeable valve assembly includes a liquid control valve and a purge gas valve which are connected by an outlet to the vaporizer in a manner minimizing the dead volume of the liquid supplied to the vaporizer. The system does not require the liquid precursor to be subjected to vacuum prior to entry into the vaporizer.

16 Claims, 5 Drawing Sheets

CLOSE-COUPLED PURGEABLE VAPORIZER VALVE

CROSS-REFERENCE TO RELATED CASES

This application claims the benefit of U.S. Provisional Application Ser. No. 60/952,014; filed Jul. 26, 2007, the disclosure of which is expressly incorporated herein by reference.

TECHNICAL FIELD

The present invention relates, in general, to a valve assembly for a fluid delivery system. More particularly, this invention provides purgeable vaporizer valve assembly for an integrated fluid delivery system (IFDS) which is closely-coupled to a vaporizer, for providing high purity fluid streams, such as for a wafer processing chamber.

BACKGROUND

Atomizing and/or vaporizing a liquid in a gas stream is often necessary in high purity fluid processing applications. For example, these processes may be employed to deposit high-purity, metal oxide films on a substrate. Moreover, the liquid mixtures may also be utilized for spray coating, spin coating and sol-gel deposition of materials. In particular, chemical vapor deposition (CVD) is an increasingly utilized high purity fluid delivery process for forming solid materials, such as coatings or powders by way of reactants in a vapor phase. Typically, a reactant vapor is created by heating a liquid to an appropriate temperature and bubbling a flow of carrier gas through the liquid (i.e. high purity fluid stream) to transport the vapor into a CVD chamber. Specifically, a gas stream and liquid stream are introduced into a single channel or conduit at a T-junction. The CVD system pumps a fluid stream at a steady, controlled rate into a hot region which may include ultrasonic energy for effecting the mixture components. However, this technique creates a large dead volume of material upon discontinuance of the process. Further, bubbling can often be an unpredictable method of vaporization, in which the precise quantity of the liquid reactant is difficult to control.

Typically, an integrated fluid and vapor delivery system is comprised of a liquid flow controller and a vaporizer and a vapor outlet manifold. The liquid flow controller calibration and response procedure conducted within the manufacturing procedure for the controller is designed to optimize the delivery and response times of liquid delivery (not downstream vapor delivery performance). It has been presumed in the industry that adequate calibration and response of liquid flow by the liquid flow controller is sufficient to provide optimized performance of vapor delivery in an integrated liquid and vapor delivery system. However, while adequate liquid flow control is necessary, it is not sufficient to optimize vapor delivery performance. Thus, there is a need for an integrated fluid and vapor delivery system design that does sufficiently optimize vapor delivery.

Accordingly, there is a need for an atomizer which predictably atomizes a fluid while virtually eliminating dead volume upon discontinuance of the atomization process.

SUMMARY

At least one embodiment of the invention provides A fluid and vapor delivery system comprising: a source of liquid precursor; a flow meter; a purgeable valve assembly comprising a liquid control valve, a gas valve, and a passageway between the liquid control valve and the gas valve, the passageway connected to a passageway outlet extending from the purgeable valve assembly; and a vaporizer in fluid communication with the passageway outlet of the purgeable valve assembly; wherein the purgeable valve assembly is closely coupled to the vaporizer.

At least one embodiment of the invention provides a method for providing a liquid to a vaporizer, the method comprising the steps of: providing a source of liquid to a liquid control valve of a purgeable valve assembly; opening the liquid control valve to direct a flow of liquid through a passageway of the purgeable valve assembly and into the vaporizer; closing the liquid control valve to halt the flow of liquid into the vaporizer; providing a source of gas to a gas valve of a purgeable valve assembly; and opening the gas valve to direct a low flow of purge gas into the passageway of the purgeable valve assembly and into the vaporizer to sweep away liquid downstream of the liquid control valve.

At least one embodiment of the invention provides a method for providing a liquid to a vaporizer, the method comprising the steps of: closely coupling a purgeable valve assembly to a vaporizer, the purgeable valve assembly comprising a liquid control valve a and a gas purge valve; providing a source of liquid to the liquid control valve; opening the liquid control valve to direct a flow of liquid through a passageway of the purgeable valve assembly and into the vaporizer; closing the liquid control valve to halt the flow of liquid into the vaporizer; providing a source of gas to the gas purge valve; and opening the gas purge valve to direct a low flow of purge gas into the passageway of the purgeable valve assembly and into the vaporizer to sweep away liquid downstream of the liquid control valve.

BRIEF DESCRIPTION OF THE DRAWING

Embodiments of this invention will now be described in further detail with reference to the accompanying drawing, in which.

DETAILED DESCRIPTION OF THE DRAWINGS

Figure 1:
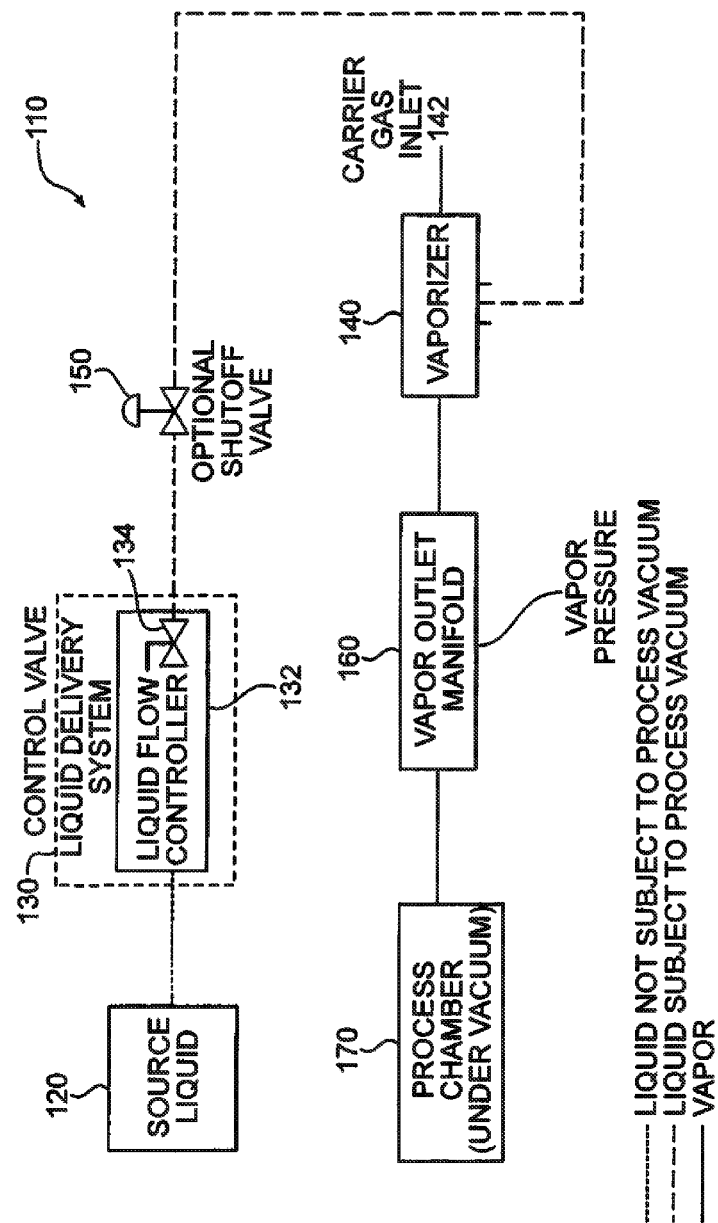
FIG. 1 is a schematic view of a typical prior art CVD system.

Referring now to FIG. 1, a prior art CVD 110 system is shown comprising a source of liquid 120 providing liquid to a liquid delivery system 130. The liquid delivery system 130 includes a liquid flow controller 132 having control valve 134. The liquid leaving the control valve 134 is subject to process vacuum. The liquid is supplied to a vaporizer 140 through an optional shutoff valve 150. A supply of carrier gas 142 is also supplied to the vaporizer 140. A carrier gas is typically used in vaporizing systems to reduce the temperature required to achieve vaporization (based on the partial pressure of the vapor [calculated using the mole ratio of the liquid and carrier] being lower than the vapor pressure at that temperature). Lower vaporization temperature may minimize precursor breakdown and damage. Vapor exits the vaporizer 140 and is supplied to the vapor outlet manifold 160 and eventually to a process chamber 170 under vacuum.

Figure 2:
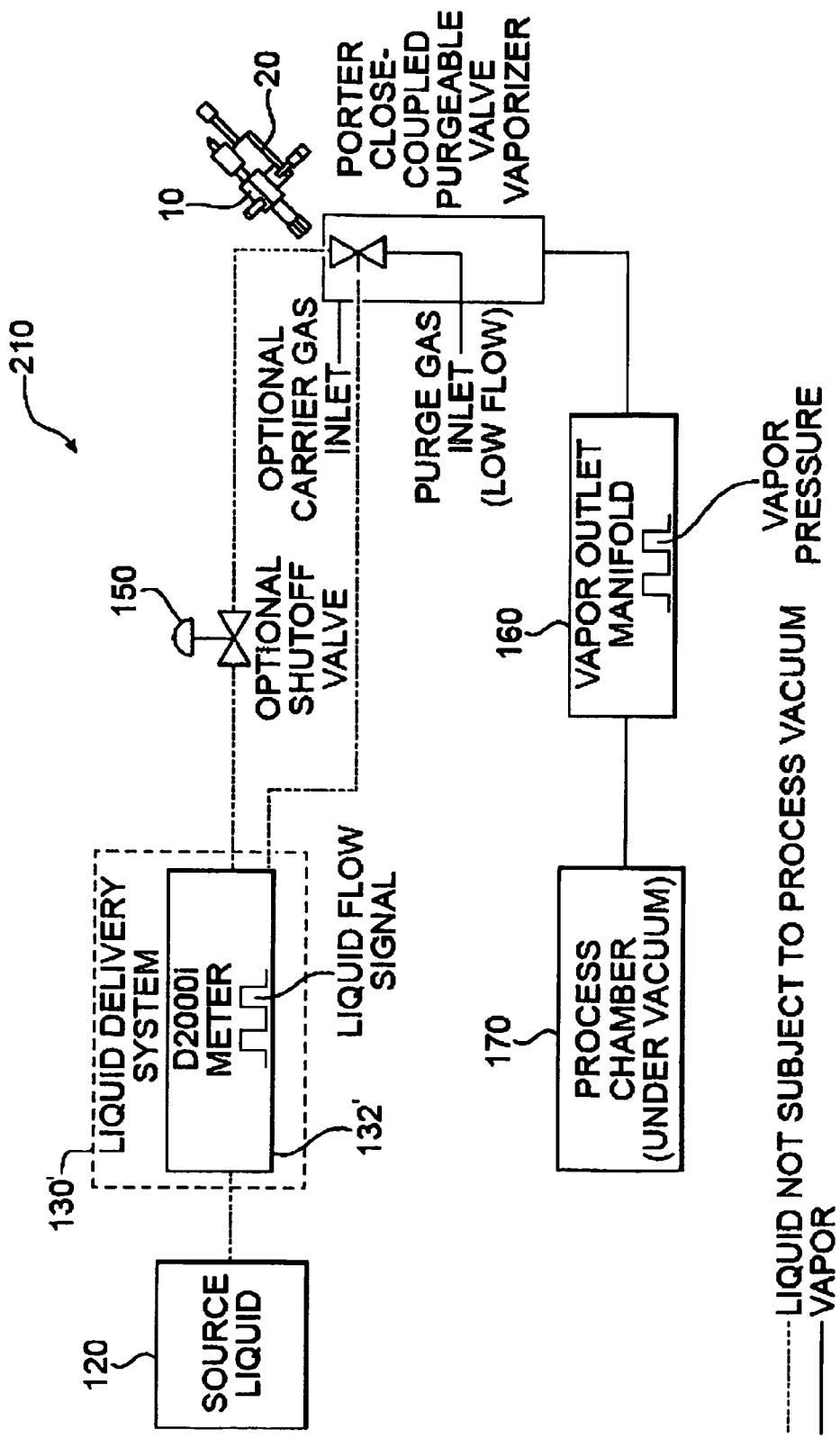
FIG. 2 is a schematic view of an embodiment of a CVD system of the present invention incorporating an embodiment of the purgeable valve assembly of the present invention.

Referring now to FIG. 2, a CVD system 210 of the present invention is similar to system 110, however, the prior art vaporizer is replaced by an embodiment of the purgeable valve assembly 10 attached to a vaporizer 20. In addition, the fluid delivery system 130' includes flow meter 132' but does not include a control valve. Whereas the prior art control valve 134 was positioned remote from the vaporizer 140, the purgeable valve assembly 10 including the control valve is closely coupled to the vaporizer 20. The term "closely coupled" as used herein is given its plain meaning that the two elements are proximate to each other as either directly attached to each other or proximately positioned spaced from each other by a spacer or insulator. This placement of the control valve improves the system by allowing liquid all the way to the entry to the vaporizer to be unaffected by the process chamber vacuum as discussed below.

Figure 3:
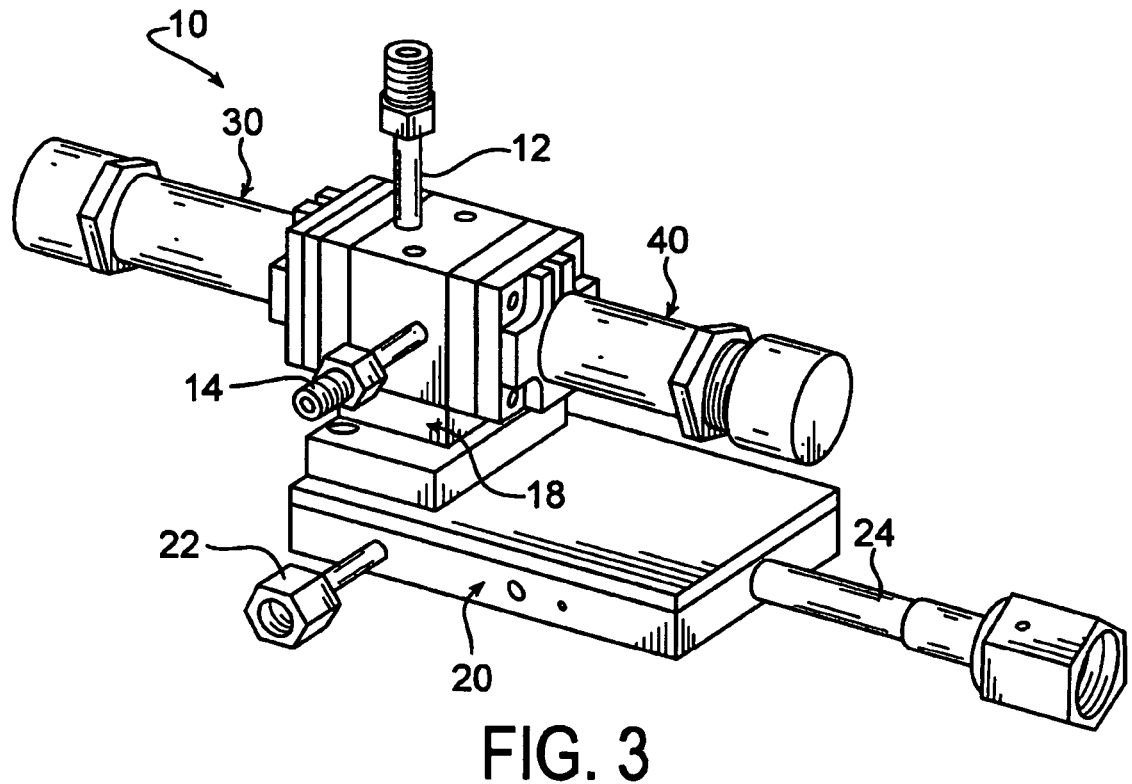
FIG. 3 is a perspective view of the purgeable valve assembly shown in FIG. 2.

FIG. 3 provides a perspective view of the purgeable valve assembly 10 attached to a vaporizer 20. An insulator 18 may be positioned between the purgeable valve assembly 10 and the vaporizer 20 to protect the purgeable valve assembly 10 from the high temperatures of the vaporizer 20. The purgeable valve assembly 10 comprises a liquid control valve 30, and a gas valve 40. The gas valve 40 is used for the purge function of the valve assembly 10 as discussed below. The purgeable valve assembly 10 comprises a liquid inlet 12 and a purge gas inlet 14. The vaporizer 20 comprises an carrier gas inlet 22 and a vapor outlet 24 extending there from. It is contemplated that any type of vaporizer 20 can be used in a close coupled configuration with the purgeable valve assembly 10, such as the standard vaporizer shape and size, the tall shape, and the "dual" vaporizer (two vaporizers essentially mounted side by side—for slower vaporization precursors) all of which are known in the art.

Figure 4:
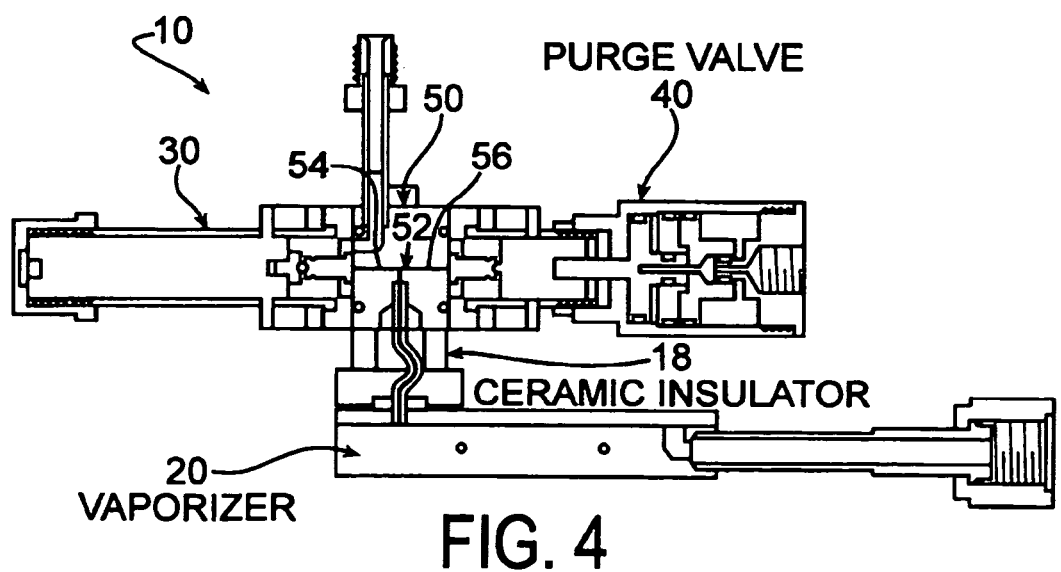
FIG. 4 is a sectional view of the purgeable valve assembly shown in FIG. 2.

Referring to FIG. 4, the purgeable valve assembly 10 is shown in a sectional view with vaporizer 20 and with insulator 18 there between. The liquid control valve 30 is shown on the left as a piezoelectric valve having a low dead volume orifice and seat area. The gas valve 40 or purge valve is shown on the right side of the middle section 50 of the assembly 10. The right side of the gas valve 40 is shown as a pneumatically activated diaphragm valve and left side of the gas valve 40 is shown with a low dead volume orifice and seat area (similar to the liquid control valve 30). In the middle section 50 of the assembly 10, at the intersection of the right and left valve orifice and seat of each, is illustrated a T section 52 of internal flow path. The left leg 54 of the top of the T section 52 is the seat section 54 of the liquid control valve 30. The right leg 56 of the top of the T section passageway 52 is the seat section of the purge valve 40. Both valve seat section legs 54, 56 are placed effectively away from the vaporizer heated zone such that, particularly for the liquid control valve 30, upon valve shutoff, the precursor liquid is maintained at a suitably low temperature to minimize precursor degradation due to high temperatures. The internal volume of the entire T section 52 is minimized such that the dead volume is minimized. In this embodiment, the bottom section of the T 52 has an appropriate curvature to accommodate tolerances of assembly and to create an upper assembly of the purgeable valve assembly 10 that may be easily disassembled from the vaporizer section 20 below. This configuration makes preventative maintenance procedures simpler and faster, as a replacement vaporizer 20 may be attached to the purgeable valve assembly 10.

Figure 5:
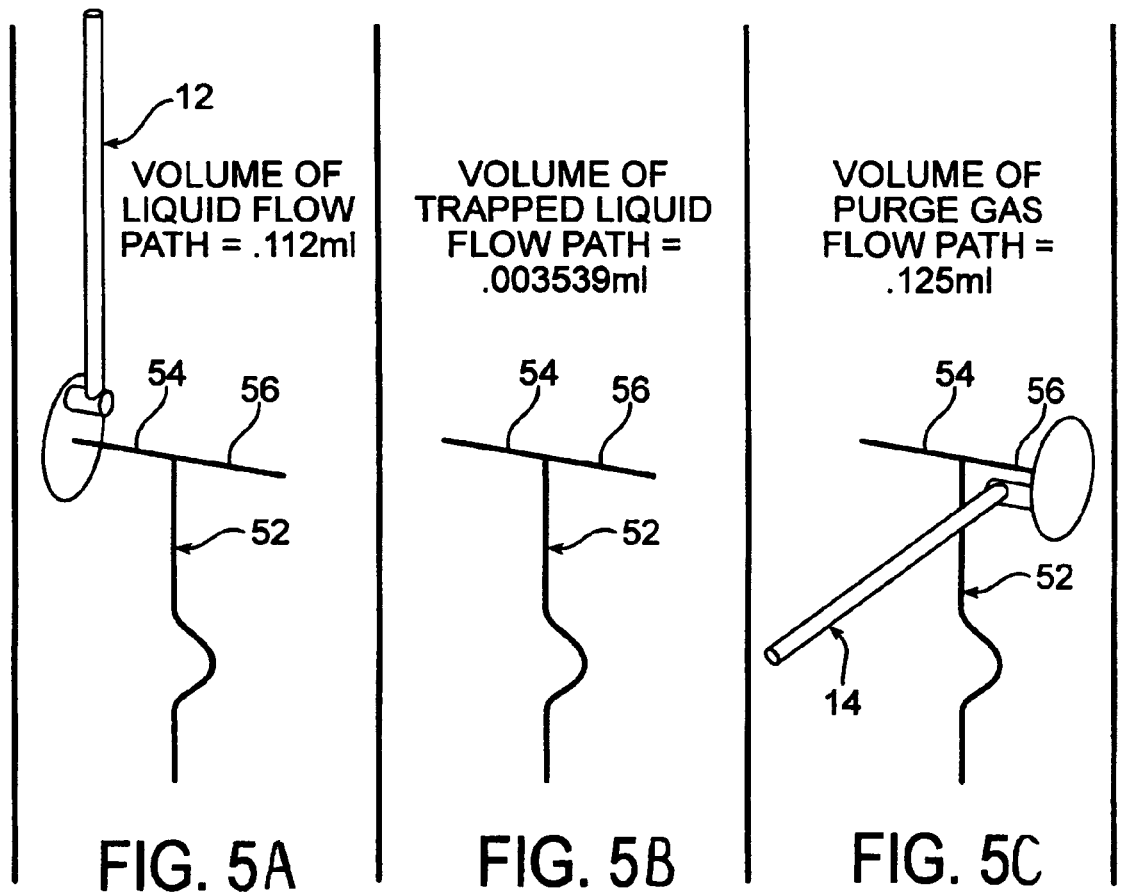
FIG. 5A shows a representation of the liquid flow path of the purgeable valve assembly when the liquid valve is open and the purge gas valve is closed.
FIG. 5B shows a representation of the total volume of liquid trapped in the purgeable valve assembly when the liquid valve is closed and the purge gas valve is closed.
FIG. 5C shows a representation of the purge gas flow path of the purgeable valve assembly when the liquid valve is closed and the purge gas valve is open.

In operation of the purgeable valve assembly 10 and vaporizer 20, the liquid control valve 30 opens as shown in FIG. 5A as the deposition process is being conducted. The liquid flows through the passageway 52 to the vaporizer 20 where it is vaporized. Accordingly the vaporizer 20 effectively vaporizes from a direct liquid source flow (unmixed and unatomized liquid into the vaporizer). The gas stream is introduced at the outlet 24 of the vaporizer 20, such that vapor and a gas stream are mixed together. The vaporized liquid and the carrier gas exits the vaporizer 20. The liquid control valve 30 is shut off when the deposition process is terminated, leaving a minimized downstream volume of liquid or dead volume liquid that is subject to process vacuum and is best shown in FIG. 5B. The purge valve 40 is then opened as shown in FIG. 5C and the purge gas, which could be helium or other suitable gases, sweeps away the downstream minimized dead volume upon discontinuance of the process, thus minimizing the time of contact of precursor with any vaporizer heated zone to minimize precursor degradation. The purge gas also effectively prepares the system for correct control of the entry of the liquid stream to the vaporizer upon the continuance of the process at the next process cycle.

With close coupling, the liquid control valve 30 of purgeable valve assembly 10, is mounted onto a precursor vaporizer 20 directly at the point of the heated zone of the vaporizer 20. The resultant apparatus becomes a coordinated liquid control and vaporization system within a larger liquid delivery system for chemical vapor deposition. With the precursor being vaporized at the point of the heated zone, the system has the potential of clogging less and increasing the time between required maintenance of the entire CVD tool. There is less wasted precursor, because almost all of it is deposited as opposed to some being pulled through the vacuum chamber after plasma has stopped (as happens with prior art systems). For Atomic Layer Deposition, the close coupling of the valve makes it possible for a very precise and small amount of liquid to be delivered and then immediately be vaporized.

Figure 6:
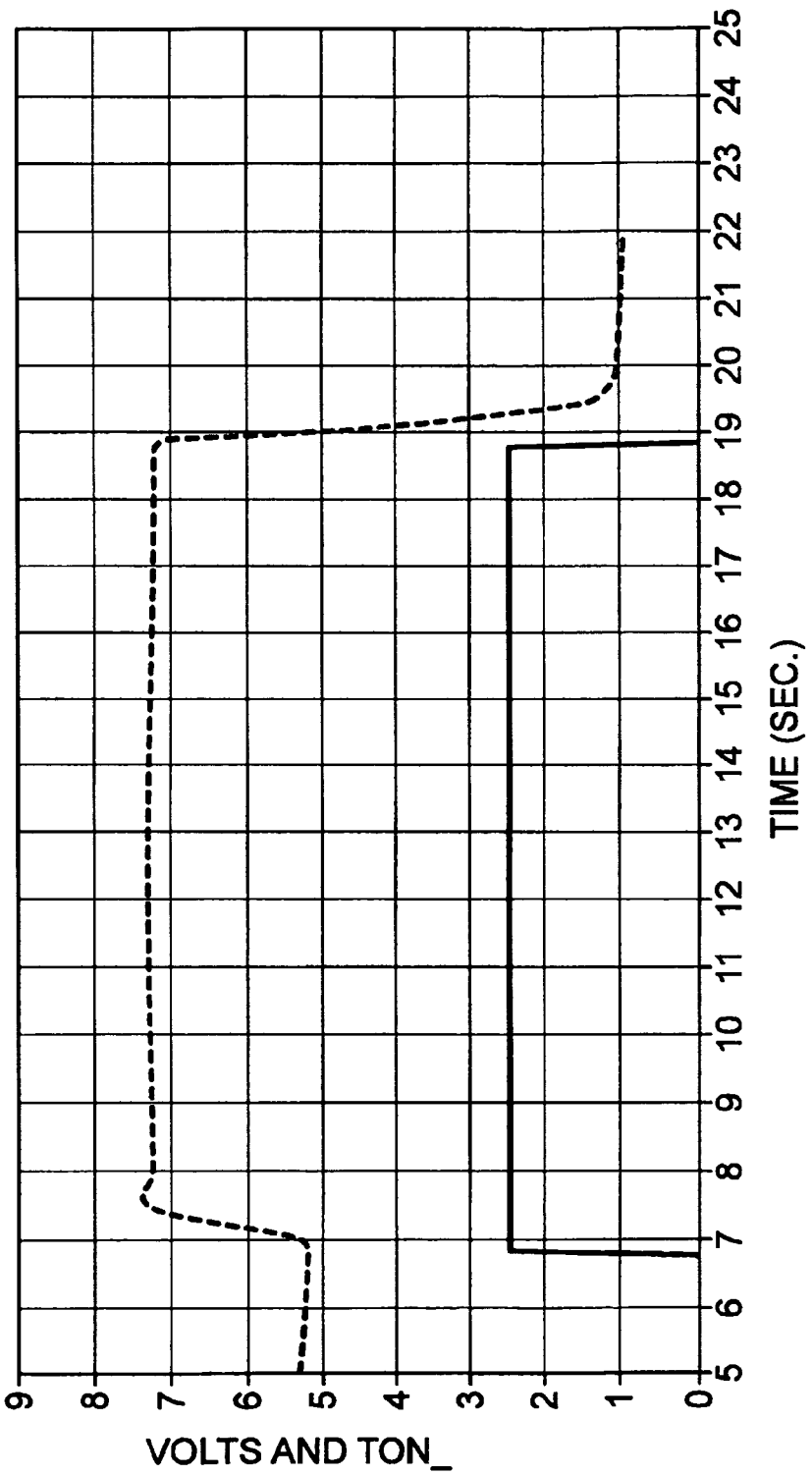
FIG. 6 is a graph of the pressure in the vapor outlet manifold which is downstream of a purgeable valve assembly that is closely coupled to a vaporizer.

Referring now to FIG. 6, the close coupling of the purgeable valve assembly to the vaporizer significantly improves the vaporization performance over prior art system 110, especially in fast cycles of precursor delivery (less than 6 seconds), such that the rise and fall of vapor pressure in items downstream of the vaporizer is able to be controlled in an idealized square wave of performance. During the off cycle, when the liquid that is within the dead volume is subject to process vacuum, the liquid is drawn or conveyed through the heated zone of the vaporizer and the result is that, since the dead volume is significantly minimized, the pressure in the vapor outlet manifold drops rapidly. The pressure comes down quickly and uniformly, eliminating any erratic characteristics that could cause degraded overall performance in the chemical vapor deposition. The minimized dead volume also eliminates the cause of degraded performance during the subsequent on cycle of the process. Since all of the minimized dead volume is now easily evacuated from the lines during the off cycle (the degree of evacuation is now not dependent on the length of time of the off cycle), and then the dead volume is easily and quickly filled upon opening of the control valve, the first portion of the on cycle, consisting of filling the dead volume completely before the liquid may enter the heated zone of the vaporizer, is significantly reduced. Therefore, the rise in pressure of the vapor outlet manifold is not significantly delayed by the time to fill the dead volume. The filling and vaporization in the first portion of the on cycle is significantly improved and is not erratic or variable in effect, and does not depend on the timing of the on cycle and off cycle. The result is significantly improved overall performance in the chemical vapor deposition.

An embodiment of the invention as shown in FIG. 2, provides an integrated fluid and vapor delivery system that sufficiently optimizes vapor delivery as measured by the rise and fall of the pressure within the typical design element of the vapor outlet manifold. Using an integrated system of a liquid flow meter 132' and a purgeable valve assembly 10 closely coupled to a vaporizer 20, a manufacturing procedure for this system has been devised such that the close-coupled valve response performance, as controlled by the electronic control functions housed within the flow meter, is optimized for pressure rise and fall of a vapor outlet manifold downstream of the vaporizer (the vaporizer is fully functioning and creating vapor during the devised manufacturing procedure for response performance adjustment). The control parameter adjustment values for optimized rise and fall of vapor pressure are or may be different than those chosen for optimized liquid delivery response. Thus, by integrating the system design elements and using an integrated manufacturing response procedure, the overall performance of the integrated fluid and vapor delivery system is significantly improved over that achieved by merely calibrating and response adjusting individual design elements.

Alternatively, if an integrated system of flow meter 132' and a purgeable valve assembly 10 closely coupled to a vaporizer 20 are calibrated and response adjusted for optimized rise and fall of pressure within a downstream vapor outlet manifold, the downstream vapor outlet manifold may be eliminated in the actual field embodiment of the integrated fluid and vapor delivery system, thus further simplifying the system design.

Accordingly, it has been shown that the purgeable valve assembly 10 closely coupled to the vaporizer 20 enables improved vapor pressure response characteristics for the vapor outlet manifold, minimizes clog potential by keeping liquid control valve orifice away from the heated area of the vaporizer by utilizing an insulator, and minimizes the volume of cool liquid downstream after the liquid control valve is closed.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

What is claimed is:

1. A fluid and vapor delivery system comprising: a source of liquid precursor; a flow meter; a purgeable valve assembly comprising a liquid control valve, a gas valve, and a passageway between the liquid control valve and the gas valve, the passageway connected to a passageway outlet extending from the purgeable valve assembly; a vaporizer in fluid communication with the passageway outlet of the purgeable valve assembly; and a shutoff valve disposed downstream of the flow meter and upstream of the purgeable valve assembly; wherein the purgeable valve assembly is closely coupled to the vaporizer.

2. The fluid and vapor delivery system of claim 1, wherein a spacer is positioned between the purgeable valve assembly and the vaporizer.

3. The fluid and vapor delivery system of claim 2, wherein the spacer is at least partially composed of a ceramic material.

4. The fluid and vapor delivery system of claim 2, wherein the spacer is an insulator.

5. The fluid and vapor delivery system of claim 1, wherein the liquid precursor is not subject to vacuum prior to entering the vaporizer.

6. The fluid and vapor delivery system of claim 1, wherein the liquid control valve and the gas valve of the purgeable valve assembly are positioned along a single axis.

7. The fluid and vapor delivery system of claim 1, wherein the volume of the passageway and the passageway outlet is a maximum dead zone volume.

8. The fluid and vapor delivery system of claim 6, wherein the maximum dead zone volume is less than 0.005 ml.

9. A method for providing a liquid to a vaporizer, the method comprising the steps of: providing a source of liquid to a liquid control valve of a purgeable valve assembly;
providing a flow meter;
providing a shutoff valve disposed downstream of the flow meter and upstream of the purgeable valve assembly;
closely coupling the purgeable valve assembly to the vaporizer;
opening the liquid control valve to direct a flow of liquid through a passageway of the purgeable valve assembly and into the vaporizer;
closing the liquid control valve to halt the flow of liquid into the vaporizer;
providing a source of gas to a gas valve of a purgeable valve assembly; and
opening the gas valve to direct a low flow of purge gas into the passageway of the purgeable valve assembly and into the vaporizer to sweep away liquid downstream of the liquid control valve.

10. The method of claim 9, wherein the step of closely coupling the purgeable valve assembly to the vaporizer includes the step of spacing the purgeable valve assembly from the vaporizer using a spacer.

11. The method of claim 9, wherein the liquid is not subjected to vacuum prior to entry into the vaporizer.

12. The method of claim 9, comprising the step of using the flow meter with the purgeable valve assembly to optimize the pressure rise and fall of a vapor outlet manifold downstream of the vaporizer.

13. A method for providing a liquid to a vaporizer, the method comprising the steps of:
closely coupling a purgeable valve assembly to a vaporizer, the purgeable valve assembly comprising a liquid control valve and a purge gas valve;
providing a flow meter;
providing a shutoff valve disposed downstream of the flow meter and upstream of the purgeable valve assembly;
providing a source of liquid to the liquid control valve;
opening the liquid control valve to direct a flow of liquid through a passageway of the purgeable valve assembly and into the vaporizer;
closing the liquid control valve to halt the flow of liquid into the vaporizer;
providing a source of gas to the purge gas valve; and
opening the purge gas valve to direct a low flow of purge gas into the passageway of the purgeable valve assembly and into the vaporizer to sweep away liquid downstream of the liquid control valve.

14. The method of claim 13, wherein the step of closely coupling the purgeable valve assembly to the vaporizer includes the step of spacing the purgeable valve assembly from the vaporizer using a spacer.

15. The method of claim 13, wherein the liquid is not subjected t vacuum prior to entry into the vaporizer.

16. The method of claim 13, comprising the step of using the flow meter with the purgeable valve assembly to optimize the pressure rise and fall of a vapor outlet manifold downstream of the vaporizer.

* * * * *